(12) United States Patent
Yanagisawa et al.

(10) Patent No.: US 9,770,773 B2
(45) Date of Patent: Sep. 26, 2017

(54) ELECTRIC DISCHARGE MACHINING APPARATUS

(71) Applicant: SODICK CO., LTD., Kanagawa (JP)

(72) Inventors: Tomoyuki Yanagisawa, Kanagawa (JP); Tatsuo Toyonaga, Kanagawa (JP)

(73) Assignee: SODICK CO., LTD., Kanagawa (JP)

( * ) Notice: Subject to any disclaimer, the term of this patent is extended or adjusted under 35 U.S.C. 154(b) by 206 days.

(21) Appl. No.: 14/419,479

(22) PCT Filed: Aug. 7, 2013

(86) PCT No.: PCT/JP2013/071350
§ 371 (c)(1),
(2) Date: Feb. 4, 2015

(87) PCT Pub. No.: WO2014/024918
PCT Pub. Date: Feb. 13, 2014

(65) Prior Publication Data
US 2015/0217391 A1    Aug. 6, 2015

(30) Foreign Application Priority Data

Aug. 8, 2012  (JP) ................................ 2012-175874

(51) Int. Cl.
*B23H 1/02*   (2006.01)
*B23H 7/04*   (2006.01)
*B23H 7/14*   (2006.01)

(52) U.S. Cl.
CPC .............. *B23H 1/022* (2013.01); *B23H 7/04* (2013.01); *B23H 7/14* (2013.01); *B23H 1/02* (2013.01)

(58) Field of Classification Search
CPC . B23H 1/02; B23H 1/022; B23H 7/14; B23H 7/04
See application file for complete search history.

(56) References Cited

U.S. PATENT DOCUMENTS 4,864,213 A  *  9/1989  Kido ....................... H02M 1/36
                                              323/270
5,317,122 A  *  5/1994  Ito ........................... B23H 1/022
                                              219/69.18

(Continued)

FOREIGN PATENT DOCUMENTS

CN    101932402    12/2010
CN    101932404    12/2010

(Continued)

OTHER PUBLICATIONS

"International Search Report (Form PCT/ISA/210)", dated Sep. 3, 2013, with English translation thereof, pp. 1-2.

*Primary Examiner* — Geoffrey S Evans
(74) *Attorney, Agent, or Firm* — Jianq Chyun IP Office

(57) ABSTRACT

The present invention relates to an electric discharge machining device. The electric discharge machining device includes: a first switch provided between the positive pole of a power supply and a work piece; a second switch provided between the negative pole of the power supply and the work piece; a third switch provided between the negative pole of the power supply and a tool electrode; a fourth switch provided between the positive pole of the power supply and the tool electrode; and a pulse generating device. In order to supply current pulses with a straight polarity, the pulse generating device repeatedly switches on and off either the first or third switch while the other switch is on. In order to supply current pulses with a reverse polarity, the pulse generating device repeatedly switches on and off either the second or fourth switch while the other switch is on.

12 Claims, 5 Drawing Sheets

(56) References Cited

U.S. PATENT DOCUMENTS

| | | | | |
|---|---|---|---|---|
| 5,359,169 A | * | 10/1994 | Kaneko | B23H 7/04 219/69.13 |
| 5,416,290 A | * | 5/1995 | Magara | B23H 1/022 219/69.18 |
| 5,585,014 A | | 12/1996 | Magara | |
| 2010/0294743 A1 | | 11/2010 | Hashimoto et al. | |
| 2011/0000889 A1 | * | 1/2011 | Hashimoto | B23H 1/022 219/69.13 |

FOREIGN PATENT DOCUMENTS

| | | |
|---|---|---|
| JP | 61-260929 | 11/1986 |
| JP | 62-287916 | 12/1987 |
| JP | 2011-183515 | 9/2011 |
| RU | 2140834 | 11/1999 |
| SU | 1743739 | 6/1992 |
| WO | 2009/096025 | 8/2009 |

\* cited by examiner

ELECTRIC DISCHARGE MACHINING APPARATUS

CROSS-REFERENCE TO RELATED APPLICATION

This application is a 371 application of an international PCT application serial no. PCT/JP2013/071350, filed on Aug. 7, 2013, which claims the priority benefit of Japan application no. 2012-175874, filed on Aug. 8, 2012. The entirety of each of the above-mentioned patent applications is hereby incorporated by reference herein and made a part of this specification.

BACKGROUND OF THE INVENTION

Field of the Invention

The invention relates to an electric discharge machining apparatus that supplies a current pulse to a machining gap formed between a work piece and a tool electrode to machine the work piece. In particular, the invention relates to an electric discharge machining apparatus that is capable of supplying a current pulse with a first polarity, in which the work piece is a positive potential and the tool electrode is a negative potential, and supplying a current pulse with a second polarity, in which the work piece is the negative potential and the tool electrode is the positive potential.

Description of Related Art

A polarity, in which the work piece is the positive potential and the tool electrode is the negative potential, is called "straight polarity". A polarity, in which the work piece is the negative potential and the tool electrode is the positive potential, is called "reverse polarity". The polarity of a power pulse is an important condition for electric discharge machining. Generally, in order to prevent electric corrosion of the work piece, a wire electric discharge machine maintains the average of voltages in the machining gap ("gap voltage") at 0V as much as possible by switching the polarity.

The wire electric discharge machine that applies a high frequency AC voltage to the machining gap to machine the work piece is widely known. With such a wire electric discharge machine, the current pulse having a short ON time improves the surface roughness. However, as the size of the machining gap and the machining area change, the impedance in the machining gap changes. If the impedance changes significantly, the no-load voltage does not go up high enough and the power supplied to the machining gap would be lower than expected.

Patent Literature 1 discloses an electric discharge machining apparatus, in which an impedance matching circuit is provided between an AC power supply and the machining gap. The AC power supply is connected to the machining gap through a proper power cable. The impedance matching circuit suppresses undesirable influence of the electrostatic capacity that exists in the power cable.

PRIOR ART LITERATURE

Patent Literature

[Patent Literature 1] U.S. Pat. No. 5,585,014

SUMMARY OF THE INVENTION

Problem to be Solved

However, the impedance matching circuit would increase the cost of the apparatus that supplies power to the machining gap. An object of the invention is to provide an electric discharge machining apparatus that is capable of supplying a current pulse with an intended waveform to the machining gap without disposing the impedance matching circuit.

Solution to the Problem

The invention relates to an electric discharge machining apparatus for machining a work piece (4) by supplying a current pulse to a machining gap (9) formed between the work piece and a tool electrode (2) while alternately switching between a straight polarity, in which the work piece is a positive potential and the tool electrode is a negative potential, and a reverse polarity, in which the work piece is the negative potential and the tool electrode is the positive potential. According to an embodiment of the invention, the electric discharge machining apparatus includes: a power supply (30) having a positive pole and a negative pole; a first switch (41) disposed between the positive pole of the power supply and the work piece; a second switch (42) disposed between the work piece and the negative pole of the power supply; a third switch (43) disposed between the tool electrode and the negative pole of the power supply; a fourth switch (44) disposed between the positive pole of the power supply and the tool electrode; and a pulse generating device (10) controlling the first switch, the second switch, the third switch, and the fourth switch. While one of the first switch and the third switch is on, the pulse generating device repeats an on/off switching operation of the other switch of the first switch and the third switch so as to supply a series of current pulses with the straight polarity to the machining gap. In addition, while one of the second switch and the fourth switch is on, the pulse generating device repeats an on/off switching operation of the other switch of the second switch and the fourth switch so as to supply a series of current pulses with the reverse polarity to the machining gap.

Preferably, a bridge circuit is formed, in which a first node (51) is disposed between the first switch and the second switch, a second node (52) is disposed between the second switch and the third switch, a third node (53) is disposed between the third switch and the fourth switch, and a fourth node (54) is disposed between the fourth switch and the first switch. The first node is connected to the work piece, the second node is connected to the negative pole of the power supply, the third node is connected to the tool electrode, and the fourth node is connected to the positive pole of the power supply.

The electric discharge machining apparatus further includes: a first transistor disposed in a circuit where a current flows through the first switch, the machining gap, and the third switch with the straight polarity; a first resistor having a terminal connected to a base of the first transistor and the other terminal connected to a collector of the first transistor; a second transistor disposed in a circuit where a current flows through the fourth switch, the machining gap, and the second switch with the reverse polarity; and a second resistor having a terminal connected to a base of the second transistor and the other terminal connected to a collector of the second transistor. The first transistor and the second transistor may be bipolar transistors.

The pulse generating device may switch off at least one of the second switch and the fourth switch while one of the first switch and the third switch is on so as to supply the current pulse with the straight polarity to the machining gap. The pulse generating device may switch off at least one of the first switch and the third switch while one of the second switch and the fourth switch is on so as to supply the current pulse with the reverse polarity to the machining gap.

The pulse generating device may switch off both the second switch and the fourth switch while one of the first switch and the third switch is on so as to supply the current pulse with the straight polarity to the machining gap. The pulse generating device may switch off both the first switch and the third switch while one of the second switch and the fourth switch is on so as to supply the current pulse with the reverse polarity to the machining gap.

According to another embodiment of the invention, an electric discharge machining apparatus includes: a first power supply (31) having a positive pole and a negative pole; a second power supply (32) having a positive pole and a negative pole; a first switch (41) disposed between the positive pole of the first power supply and the work piece (4); a second switch (42) disposed between the work piece and the negative pole of the second power supply; a third switch (43) disposed between the tool electrode (2) and the negative pole of the first power supply; a fourth switch (44) disposed between the positive pole of the second power supply and the tool electrode; and a pulse generating device (10) controlling the first switch, the second switch, the third switch, and the fourth switch. While one of the first switch and the third switch is on, the pulse generating device repeats an on/off switching operation of the other switch of the first switch and the third switch so as to supply a series of current pulses with the straight polarity to the machining gap. While one of the second switch and the fourth switch is on, the pulse generating device repeats an on/off switching operation of the other switch of the second switch and the fourth switch so as to supply a series of current pulses with the reverse polarity to the machining gap.

Effects of the Invention

The electric discharge machining apparatus of the invention is capable of supplying a current pulse to the machining gap at high frequency, and since the polarity switching cycle is long, the impedance matching circuit can be omitted.

DESCRIPTION OF THE EMBODIMENTS

Figure 1:
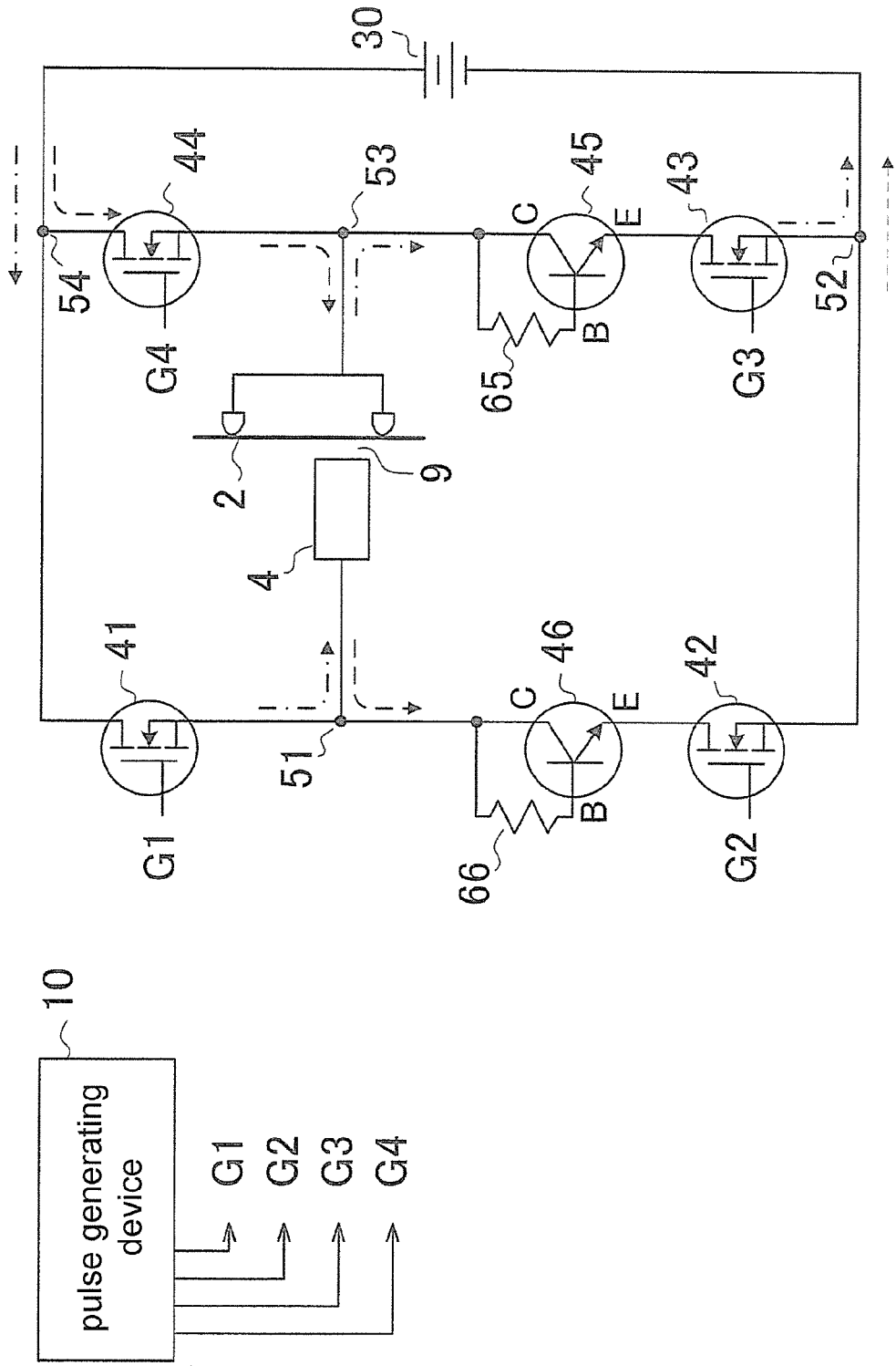
FIG. 1 is a diagram showing an embodiment of the wire electric discharge machining apparatus of the invention.

Hereinafter, an electric discharge machining apparatus of the invention is described in detail with reference to the figures. FIG. 1 illustrates an embodiment of the electric discharge machining apparatus of the invention. A tool electrode in the electric discharge machining apparatus is a wire electrode 2 that travels vertically. A machining gap 9 is formed between the wire electrode 2 and a work piece 4. The work piece 4 is fixed in a machining tank (not shown in the figure). A machining fluid is supplied into the machining tank, and the machining gap 9 is filled with the machining fluid. A major component of the machining fluid is deionized water or oil.

A bridge circuit is disposed between a DC power supply 30 and the machining gap 9. The bridge circuit includes a first switch 41, a second switch 42, a third switch 43, and a fourth switch 44. The switches 41, 42, 43, and 44 form four nodes 51, 52, 53, and 54 between the adjacent switches and are connected in series. The first switch 41, the second switch 42, the third switch 43, and the fourth switch 44 may be MOSFET.

The first node 51 is disposed between the first switch 41 and the second switch 42 and connected to the work piece 4 through a proper power cable. The second node 52 is disposed between the second switch 42 and the third switch 43 and connected to a negative pole (−) of the DC power supply 30. The third node 53 is disposed between the third switch 43 and the fourth switch 44 and connected to the wire electrode 2 through a proper power cable. The fourth node 54 is disposed between the fourth switch 44 and the first switch 41 and connected to a positive pole (+) of the DC power supply 30. The aforementioned proper power cable is a coaxial cable, for example.

A first transistor 45 is disposed between the node 53 and the third switch 43, and a second transistor 46 is disposed between the node 51 and the second switch 42. The first transistor 45 and the second transistor 46 are bipolar transistors. An emitter E of the first transistor 45 is connected to the third switch 43. A base B of the first transistor 45 is connected to a terminal of a first resistor 65. A collector C of the first transistor 45 is connected to the other terminal of the first resistor 65 and the wire electrode 2. An emitter E of the second transistor 46 is connected to the second switch 42. A base B of the second transistor 46 is connected to a terminal of a second resistor 66. A collector C of the second transistor 46 is connected to the other terminal of the second resistor 66 and the work piece 4.

The first resistor 65 determines a base current of the first transistor 45. The first transistor 45 limits the current flowing with the straight polarity and protects the first switch 41 and the third switch 43. Moreover, the second resistor 66 determines a base current of the second transistor 46. The second transistor 46 limits the current flowing with the reverse polarity and protects the second switch 42 and the fourth switch 44.

On/off switching of the first switch 41, the second switch 42, the third switch 43, and the fourth switch 44 is controlled by a pulse generating device 10. The pulse generating device 10 supplies a first gate signal G1, a second gate signal G2, a third gate signal G3, and a fourth gate signal G4 respectively to the first switch 41, the second switch 42, the third switch 43, and the fourth switch 44. When the gate signals G1, G2, G3, and G4 are on, the first switch 41, the second switch 42, the third switch 43, and the fourth switch 44 are on respectively.

Figure 2:
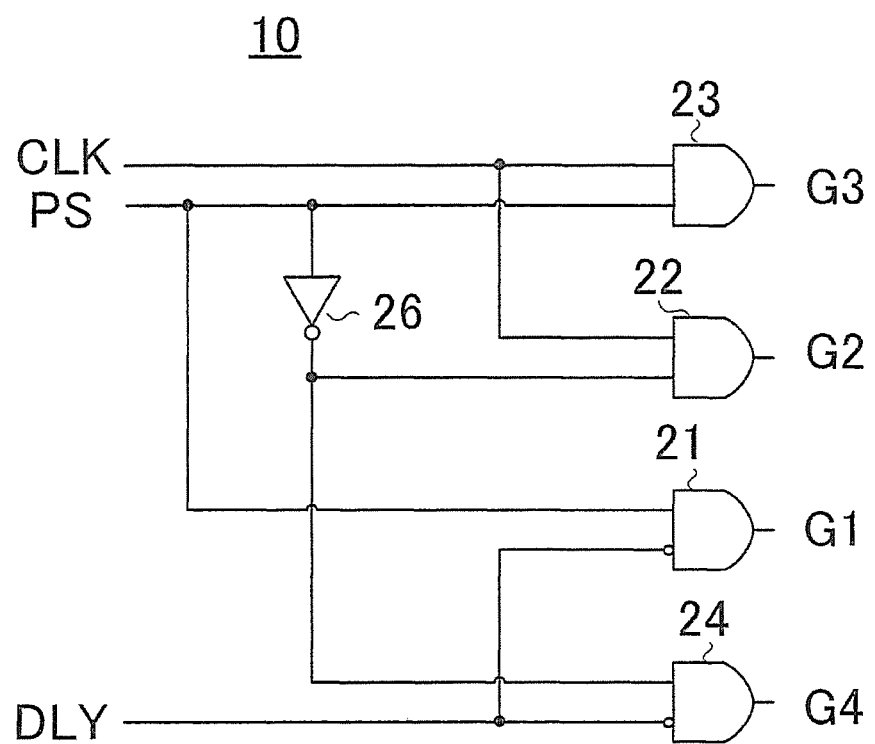
FIG. 2 is a diagram showing an example of the pulse generating device of FIG. 1.

The pulse generating device 10 is described in detail with reference to FIG. 2 and FIG. 3. As shown in FIG. 2, in the pulse generating device 10, a high frequency clock signal CLK is generated. The clock signal CLK determines the frequency of a current pulse supplied to the machining gap 9. A cycle time c1 of the current pulse is 100 ns, for example. In addition, a signal PS and a signal DLY are generated. The signal PS determines a cycle time c2 of the polarity. The cycle time c2 of the polarity is 20 μs, for example. The cycle time c1 of the current pulse is much shorter than the cycle time c2 of the polarity. The signal DLY is on when the signal PS is off, and the signal DLY is off when a delay time td passes.

The clock signal CLK is supplied to AND gates 23 and 22. The signal PS is supplied to AND gates 23 and 21. As shown in FIG. 3, the AND gate 23 allows the clock signal CLK to pass only when the signal PS is on so as to generate the third gate signal G3. The signal PS inverted by an inverter 26 is supplied to AND gates 22 and 24. The AND gate 22 allows the clock signal CLK to pass only when the signal PS is off so as to generate the second gate signal G2. An inverted signal of the signal DLY is supplied to the AND gates 21 and 24. The AND gate 21 allows the signal PS to pass only when the signal DLY is off so as to generate the first gate signal G1. The AND gate 24 allows the inverted signal of the signal PS to pass only when the signal DLY is off so as to generate the fourth gate signal G4.

Figure 3:
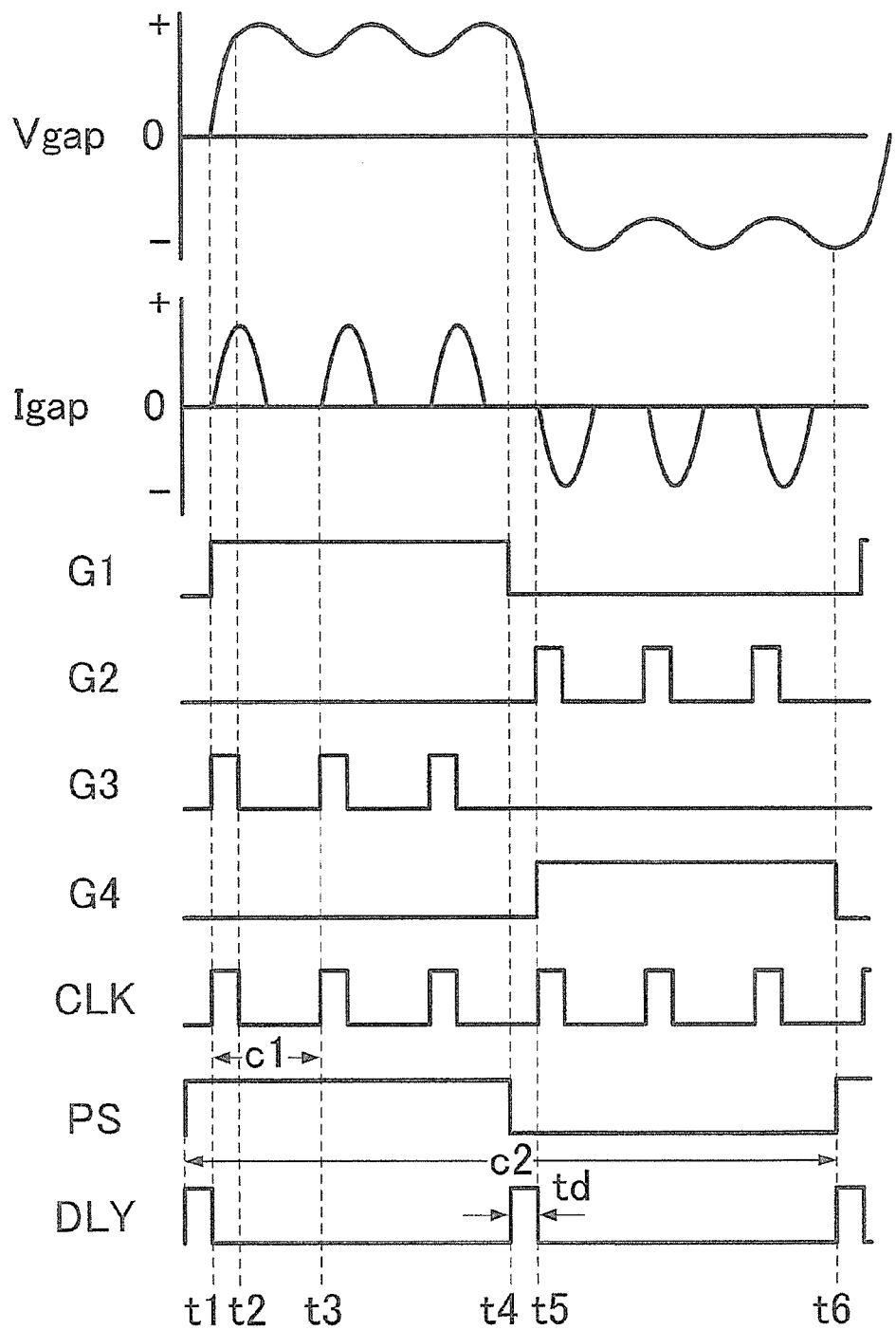
FIG. 3 is a timing chart showing an operation of the pulse generating device of FIG. 1.

As shown in FIG. 3, at a time t1, when the first gate signal G1 and the third gate signal G3 are on, the first switch 41 and the third switch 43 are on. Meanwhile, the second gate signal G2 and the fourth gate signal G4 are off, and the second switch 42 and the fourth switch 44 are off. Thus, the voltage of the DC power supply 30 is applied to the machining gap 9 with the straight polarity, in which the work piece 4 is a positive potential and the wire electrode 2 is a negative potential. As a result, a voltage Vgap of the machining gap 9 rises rapidly and electric discharge occurs. Due to the electric discharge, a current Igap flows through the machining gap 9. The one-dot dashed line in FIG. 1 indicates the flow of the current in the straight polarity. At a time t2, when the third gate signal G3 is off and the third switch 43 is off, the current Igap drops rapidly to 0. Because the circuit has no current limiting resistor, the current pulse has a steep rising edge.

As a time t3 when the cycle time c1 passes after the time t1, the third gate signal G3 is on and the third switch 43 is on, and the current pulse is generated again. While the first switch 41 is on, the on/off switching of the third switch 43 is repeated at a high frequency, and a series of current pulses is supplied to the machining gap 9 with the straight polarity. The pulse generating device 10 may switch off at least one of the second switch 42 and the fourth switch 44 while the first switch 41 is on. In the embodiment of FIG. 3, the pulse generating device 10 switches both the second switch 42 and the fourth switch 44 off during the period from the time t1 to a time t4. As a result, the current pulse that rises steeply and drops steeply is generated.

At the time t4 when half of the cycle time c2 passes after the time t1, when the first gate signal G1 is off and the first switch 41 is off, the voltage Vgap decreases rapidly. At a time t5 when the delay time td passes after the time t4, when the fourth gate signal G4 and the second gate signal G2 are on, the fourth switch 44 and the second switch 42 are on. Meanwhile, the first gate signal G1 and the third gate signal G3 are off, and the first switch 41 and the third switch 43 are off. Thus, the voltage of the DC power supply 30 is applied to the machining gap 9 with the reverse polarity, in which the wire electrode 2 is the positive potential and the work piece 4 is the negative potential. As a result, the voltage Vgap of the machining gap 9 rises rapidly and electric discharge occurs. Due to the electric discharge, the current Igap flows through the machining gap 9, and the dashed line in FIG. 1 indicates the flow of the current in the reverse polarity.

In a period when the fourth gate signal G4 is on and the fourth switch 44 is on, the on/off switching of the second switch 42 is repeated and a series of current pulses is supplied to the machining gap 9 with the reverse polarity. While the fourth switch 44 is on (t5-t6), the pulse generating device 10 may switch off at least one of the first switch 41 and the third switch 43. In the embodiment of FIG. 3, the pulse generating device 10 switches off both the first switch 41 and the third switch 43 during the period from the time t5 to the time t6. The series of current pulses with the straight polarity and the series of current pulses with the reverse polarity are supplied to the machining gap 9 alternately. Since the cycle time c2 for switching the polarity is relatively long, the voltage Vgap can go up to a sufficiently high value. In addition, because the small current pulses are generated at high frequency, the roughness of the machining surface is improved efficiently.

Figure 4:
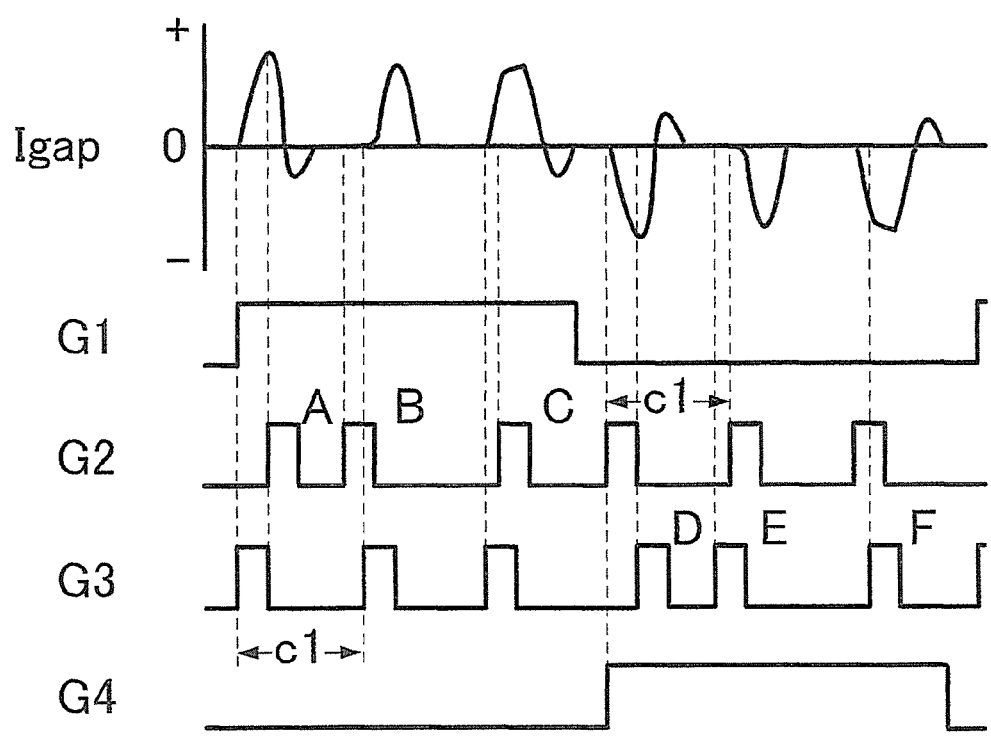
FIG. 4 is a timing chart showing an operation of another pulse generating device.

An operation of another pulse generating device is described with reference to FIG. 4. The pulse generating device 10 switches off the fourth gate signal G4 while the first gate signal G1 is on. Moreover, the pulse generating device 10 switches off the first gate signal G1 while the fourth gate signal G4 is on. In the embodiment of FIG. 4, another pulse generating device repeats the on/off switching of the second switch 42 while the first switch 41 is on. As a result, while the first switch 41 is on, the current flows with the straight polarity, as indicated by the one-dot dashed line in FIG. 1, and the current flows from the node 51 to the node 52 through the second switch 42.

Further, the aforesaid another pulse generating device repeats the on/off switching of the third switch 43 while the fourth switch 44 is on. As a result, while the fourth switch 44 is on, the current flows with the reverse polarity, as indicated by the dashed line in FIG. 1, and the current flows from the node 53 to the node 52 through the third switch 43. As described above, because a part of the current bypasses the machining gap 9, the current Igap is reduced and the roughness of the machining surface is improved.

The second gate signal G2 and the third gate signal G3 have the same on time and cycle time c1. While the first gate signal G1 is on, the second gate signal G2 temporally deviates from the third gate signal G3 and rises. FIG. 4 illustrates three types of pulses A, B, and C of the second gate signal G2. The pulse A indicates the second gate signal G2 that rises when the third gate signal G3 drops. The pulse B indicates the second gate signal G2 that rises slightly earlier than the rising of the third gate signal G3. The pulse C indicates the second gate signal G2 that rises slightly later than the rising of the third gate signal G3. While the fourth gate signal G4 is on, the third gate signal G3 temporally deviates from the second gate signal G2 and rises. FIG. 4 illustrates three types of pulses D, E, and F of the third gate signal G3.

The pulse A or D can form a current pulse that drops steeply. The pulse B or E can form a current pulse that rises gradually. The pulse C or F can form a current pulse that rises gradually at the peak. The aforesaid another pulse generating device can generate a current pulse sequence, which has a different shape from the current pulse of FIG. 3, in the machining gap 9.

Figure 5:
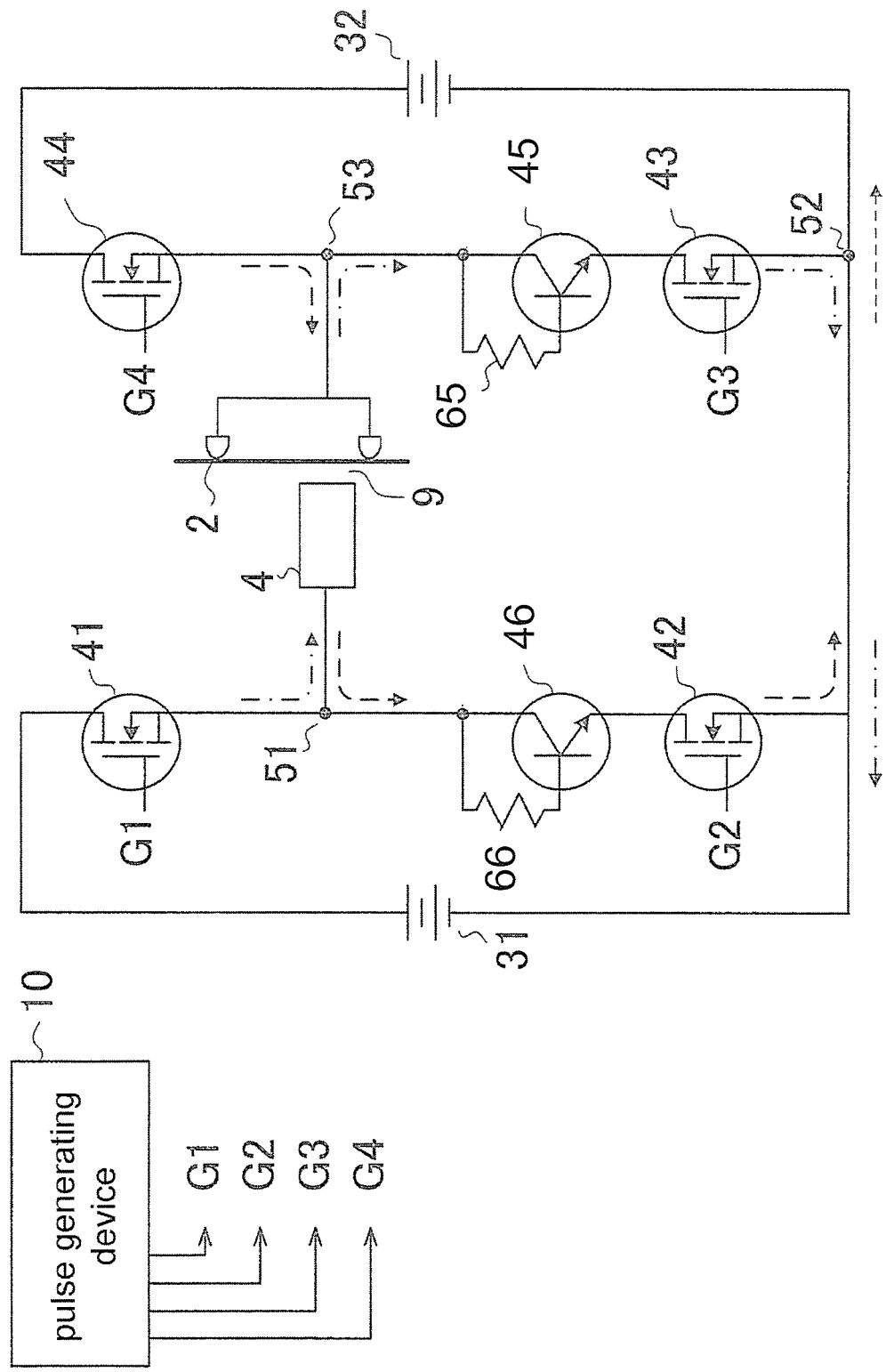
FIG. 5 is a diagram showing another embodiment of the wire electric discharge machining apparatus of the invention.

Next, another embodiment of the wire electric discharge machining apparatus of the invention is described with reference to FIG. 5. Elements the same as those of FIG. 1 are assigned with the same reference numerals, and detailed descriptions thereof are omitted hereinafter. The wire electric discharge machining apparatus includes a first power supply 31 that supplies a current pulse with the straight polarity to the machining gap 9 and a second power supply 32 that supplies a current pulse with the reverse polarity to the machining gap 9. The current with the straight polarity flows through the first switch 41, the work piece 4, the wire electrode 2, and the third switch 43 from the first power supply 31. Moreover, the current with the reverse polarity flows through the fourth switch 44, the wire electrode 2, the work piece 4, and the second switch 42 from the second power supply 32.

The descriptions are not intended to limit the electric discharge machining apparatus of the invention to the form disclosed above. Various improvements and modifications may be made with reference to the above descriptions. For example, in order to supply the current with the straight polarity to the machining gap 9, the first gate signal G1 may be supplied to the third switch 43 and the third gate signal G3 may be supplied to the first switch 41. In order to supply the current with the reverse polarity to the machining gap 9, the second gate signal G2 may be supplied to the fourth switch 44 and the fourth gate signal G4 may be supplied to the second switch 42.

Furthermore, the positions of the first transistor 45 and the second transistor 46 are not limited to the disclosure of FIG. 1. The first transistor 45 may be disposed in a circuit where the current flows through the first switch 41, the machining gap 9, and the third switch 43 with the straight polarity. The second transistor 46 may be disposed in a circuit where the current flows through the second switch 42, the machining gap 9, and the fourth switch 44 with the reverse polarity.

DESCRIPTIONS OF REFERENCE NUMERALS 2 wire electrode
4 work piece
9 machining gap
10 pulse generating device
21, 22, 23, 24 AND gate
26 inverter
30, 31, 32 power supply
41, 42, 43, 44 switch
45, 46 transistor
51, 52, 53, 54 node
65, 66 resistor

What is claimed is:

1. An electric discharge machining apparatus for machining a work piece by supplying a current pulse to a machining gap formed between the work piece and a tool electrode while alternately switching between a straight polarity, in which the work piece is a positive potential and the tool electrode is a negative potential, and a reverse polarity, in which the work piece is the negative potential and the tool electrode is the positive potential, the electric discharge machining apparatus comprising:
a power supply having a positive pole and a negative pole;
a first switch disposed between the positive pole of the power supply and the work piece;
a second switch disposed between the work piece and the negative pole of the power supply;
a third switch disposed between the tool electrode and the negative pole of the power supply;
a fourth switch disposed between the positive pole of the power supply and the tool electrode; and
a pulse generating device which comprises a logic circuitry configured to control the first switch, the second switch, the third switch, and the fourth switch,
wherein while one of the first switch and the third switch is on, the pulse generating device repeats an on/off switching operation of the other switch of the first switch and the third, switch so as to supply a series of current pulses with the straight polarity to the machining gap,
while one of the second switch and the fourth switch is on, the pulse generating device repeats an on/off switching operation of the other switch of the second switch and the fourth switch so as to supply a series of current pulses with the reverse polarity to the machining gap,
a period during one of the first switch and the third switch is on is sufficiently long that a voltage in the machining gap can sufficiently rise while the all switching repeated in another one of the first switch and the third switch, and
a period during one of the second switch and the fourth switch is on is sufficiently long that the voltage in the machining gap can sufficiently rise while the all switching repeated in another one of the second switch and the fourth switch.

2. The electric discharge machining apparatus according to claim 1, wherein a bridge circuit is formed, in which a first node is disposed between the first switch and the second switch, a second node is disposed between the second switch and the third switch, a third node is disposed between the third switch and the fourth switch, and a fourth node is disposed between the fourth switch and the first switch, and
the first node is connected to the work piece, the second node is connected to the negative pole of the power supply, the third node is connected to the tool electrode, and the fourth node is connected to the positive pole of the power supply.

3. The electric discharge machining apparatus according to claim 1, further comprising:
a first transistor disposed in a circuit where a current flows through the first switch, the machining gap, and the third switch with the straight polarity;
a first resistor comprising a terminal connected to a base of the first transistor and the other terminal connected to a collector of the first transistor;
a second transistor disposed in a circuit where a current flows through the fourth switch, the machining gap, and the second switch with the reverse polarity; and
a second resistor comprising a terminal connected to a base of the second transistor and the other terminal connected to a collector of the second transistor.

4. The electric discharge machining apparatus according to claim 3, wherein the first transistor and the second transistor are bipolar transistors.

5. The electric discharge machining apparatus according to claim 1, wherein the pulse generating device switches off at least one of the second switch and the fourth switch while one of the first switch and the third switch is on so as to supply the current pulse with the straight polarity to the machining gap; and
the pulse generating device switches off at least one of the first switch and the third switch while one of the second switch and the fourth switch is on so as to supply the current pulse with the reverse polarity to the machining gap.

6. The electric discharge machining apparatus according to claim 5, wherein the pulse generating device switches off both the second switch and the fourth switch while one of the first switch and the third switch is on so as to supply the current pulse with the straight polarity to the machining gap; and
the pulse generating device switches off both the first switch and the third switch while one of the second switch and the fourth switch is on so as to supply the current pulse with the reverse polarity to the machining gap.

7. The electric discharge machining apparatus according to claim 5, wherein while one of the first switch and the third switch is on, the pulse generating device repeats the on/off switching operation of the other switch of the second switch and the fourth switch so as to supply the current pulse with the straight polarity to the machining gap; and while one of the second switch and the fourth switch is on, the pulse generating device repeats the on/off switching operation of the other switch of the first switch and the third switch so as to supply the current pulse with the reverse polarity to the machining gap.

8. An electric discharge machining apparatus for machining a work piece by supplying at least one current pulse with a reverse polarity to a machining gap formed between the work piece and a tool electrode after supplying at least one current pulse with a straight polarity to the machining gap, wherein the work piece is a negative potential and the tool electrode is a positive potential in the reverse polarity, and the work piece is the positive potential and the tool electrode is the negative potential in the straight polarity, the electric discharge machining apparatus comprising:

a first power supply having a positive pole and a negative pole;
a second power supply having a positive pole and a negative pole;
a first switch disposed between the positive pole of the first power supply and the work piece;
a second switch disposed between the work piece and the negative pole of the second power supply;
a third switch disposed between the tool electrode and the negative pole of the first power supply;
a fourth switch disposed between the positive pole of the second power supply and the tool electrode; and
a pulse generating device which comprises a logic circuitry configured to control the first switch, the second switch, the third switch, and the fourth switch,
wherein while one of the first switch and the third switch is on, the pulse generating device repeats an on/off switching operation of the other switch of the first switch and the third switch so as to supply the current pulse with the straight polarity to the machining gap,
while one of the second switch and the fourth switch is on, the pulse generating device repeats an on/off switching operation of the other switch of the second switch and the fourth switch so as to supply the current pulse with the reverse polarity to the machining gap,
a period during one of the first switch and the third switch is on is sufficiently long that a voltage in the machining gap can sufficiently rise while the all switching repeated in another one of the first switch and the third switch, and
a period during one of the second switch and the fourth switch is on is sufficiently long that the voltage in the machining gap can sufficiently rise while the all switching repeated in another one of the second switch and the fourth switch.

9. The electric discharge machining apparatus according to claim 8, further comprising:

a first transistor disposed in a circuit where a current flows through the first switch, the machining gap, and the third switch with the straight polarity;
a first resistor comprising a terminal connected to a base of the first transistor and the other terminal connected to a collector of the first transistor;
a second transistor disposed in a circuit where a current flows through the second switch, the machining gap, and the fourth switch with the reverse polarity; and
a second resistor comprising a terminal connected to a base of the second transistor and the other terminal connected to a collector of the second transistor.

10. The electric discharge machining apparatus according to claim 9, wherein the first transistor and the second transistor are bipolar transistors.

11. The electric discharge machining apparatus according to claim 8, wherein the pulse generating device switches off at least one of the second switch and the fourth switch while one of the first switch and the third switch is on so as to supply the current pulse with the straight polarity to the machining gap; and the pulse generating device switches off at least one of the first switch and the third switch while one of the second switch and the fourth switch is on so as to supply the current pulse with the reverse polarity to the machining gap.

12. The electric discharge machining apparatus according to claim 11, wherein while one of the first switch and the third switch is on, the pulse generating device switches off both the second switch and the fourth switch so as to supply the current pulse with the straight polarity to the machining gap; and while one of the second switch and the fourth switch is on, the pulse generating device switches off both the first switch and the third switch so as to supply the current pulse with the reverse polarity to the machining gap.

* * * * *